United States Patent [19]

Pringle

[11] 3,756,080
[45] Sept. 4, 1973

[54] FUEL TANK ASSEMBLY
[75] Inventor: William L. Pringle, Grosse Pointe Shores, Mich.
[73] Assignee: William L. Pringle and Associates, Inc., Detroit, Mich.
[22] Filed: Dec. 10, 1971
[21] Appl. No.: 206,756

Related U.S. Application Data
[62] Division of Ser. No. 36,022, May 11, 1970, Pat. No. 3,648,886.

[52] U.S. Cl. .............................................. 73/290 R
[51] Int. Cl. ............................................ G01f 23/00
[58] Field of Search ...................... 73/290 R, 313; 338/41, 42

[56] References Cited
UNITED STATES PATENTS
| | | | |
|---|---|---|---|
| 2,074,959 | 3/1937 | Guest | 73/290 R |
| 3,314,292 | 4/1967 | Schulte | 73/290 R |
| 2,923,156 | 2/1960 | Young | 73/313 |
| 3,173,120 | 3/1965 | Marks | 338/41 |

Primary Examiner—Richard C. Queisser
Assistant Examiner—Denis E. Corr
Attorney—Gerald E. McGlynn, Jr., Harold W. Milton, Jr. et al.

[57] ABSTRACT

A vehicular fuel tank assembly comprising a steel outer container and a pliable inner member such as a liner or diaphragm having a plurality of circular folds in a substantially horizontal wall portion thereof to permit the center of the wall to collapse telescopically and vertically relative to the bottom of the container as fuel is exhausted from the tank assembly. This telescopic collapse provides volumetric variation in the fuel storage area and further provides variable anti-slosh baffling for the unused fuel. A control valve regulates air flow into and out of the exhausted space between the container and the internal member. Fuel gaging is accomplished by monitoring the displacement of the collapsible internal member portion relative to the container. The container is mounted on the vehicle to permit limited damped longitudinal displacement under abnormally high acceleration load conditions.

1 Claim, 8 Drawing Figures

Patented Sept. 4, 1973
3,756,080
3 Sheets-Sheet 1
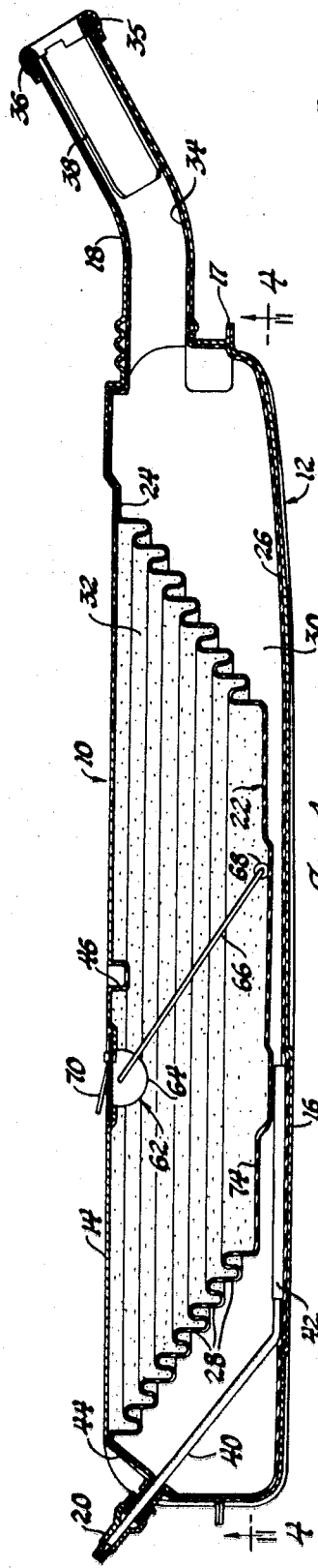
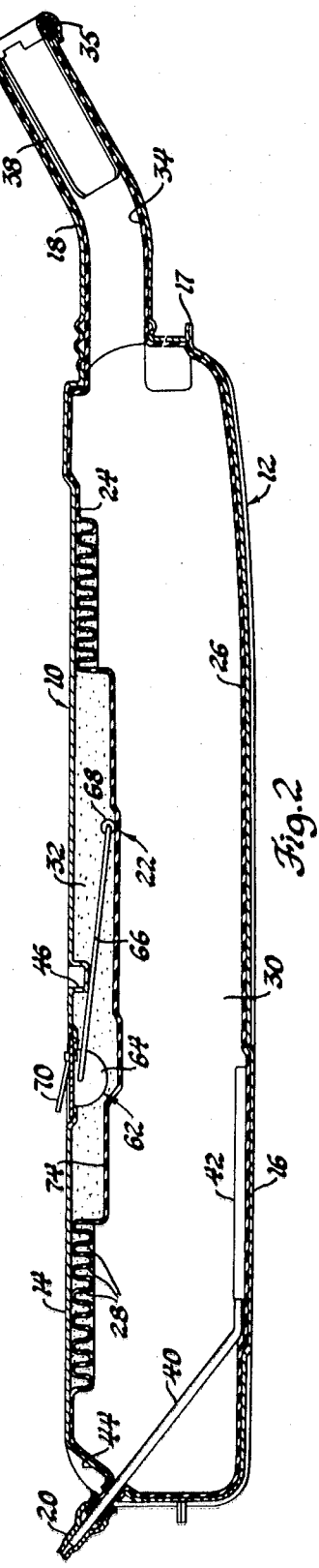
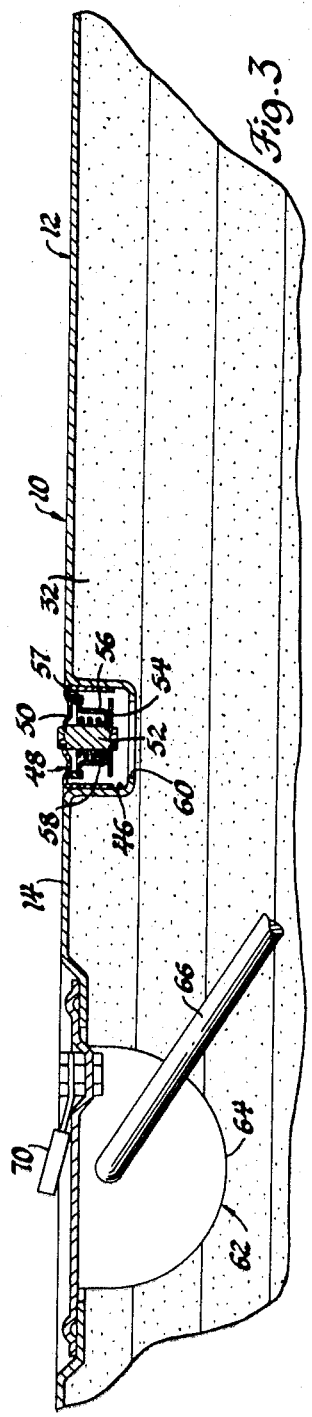

Patented Sept. 4, 1973
3,756,080
3 Sheets-Sheet 2
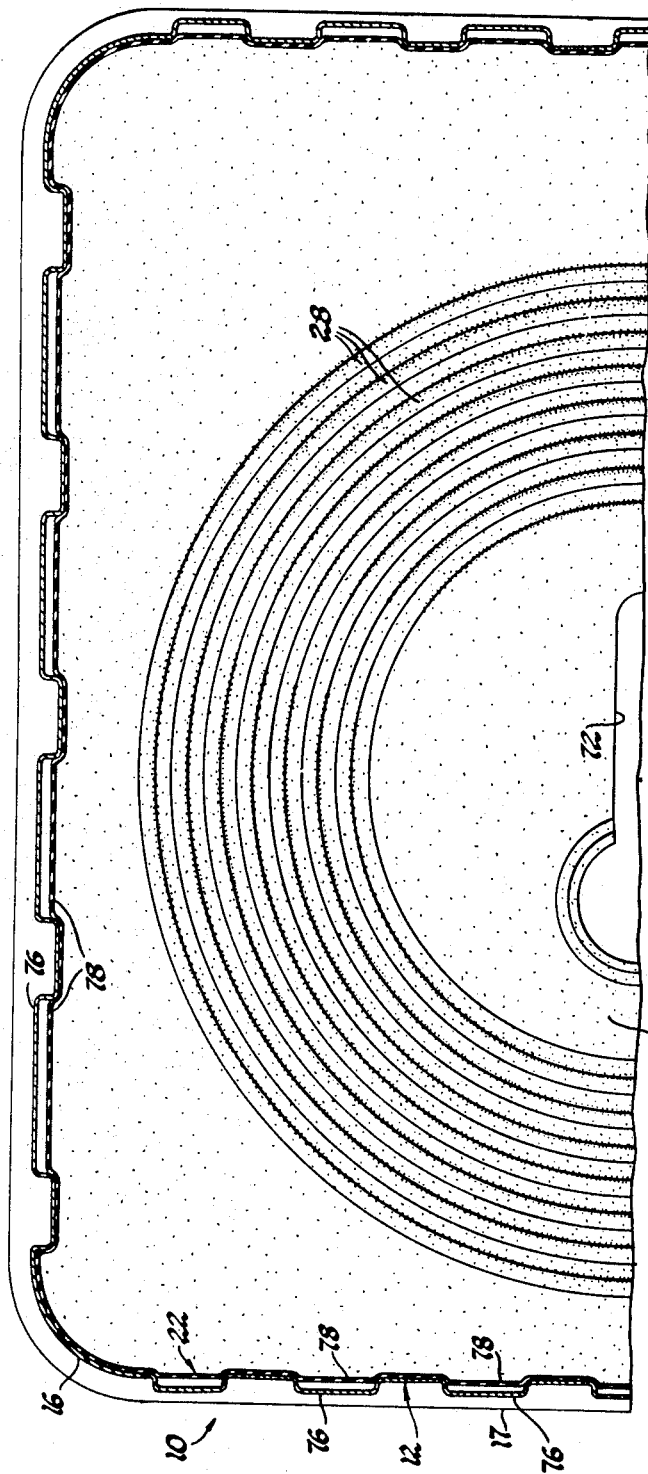
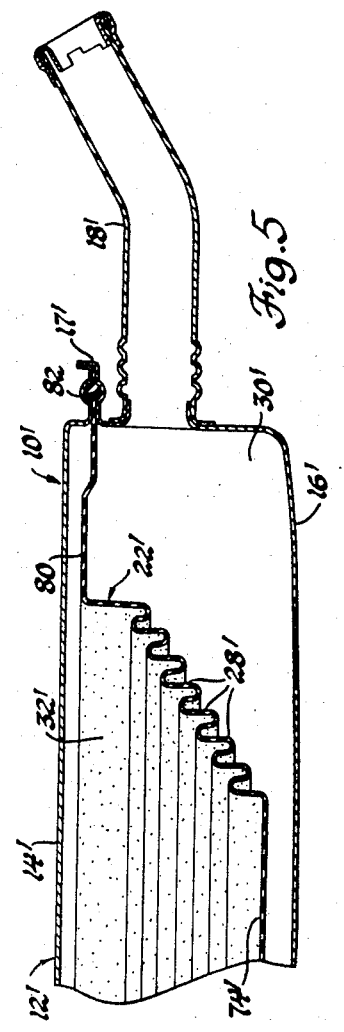

FUEL TANK ASSEMBLY

This is a division of application Ser. No. 36,022, filed May 11, 1970, now U.S. Pat. No. 3,648,886.

This invention relates to fuel tank assemblies and particularly to an improved fuel tank assembly for vehicles.

The transportation of fuel for consumption by the transporting vehicle gives rise to certain considerations in the areas of safety and air pollution. Safety considerations include (1) excessive sloshing and agitation of fuel in the tank, (2) thermal expansion of fuel in a full tank with resulting spillage in the vicinity of the vehicle, (3) the safe and satisfactory monitoring of fuel remaining in the tank, and (4) the escape of fuel from the tank due to damage caused in a collision. Air pollution considerations include (1) the evaporation of fuel from an unsealed tank and fuel distribution system, (2) the overflow of liquid fuel from the tank due to thermal expansion, and (3) the escape of liquid fuel arising from a rupture or a loss of integrity of the fuel tank.

Past efforts to deal with these considerations have generally been carried out on a piecemeal basis; that is, tank liners and the like have been proposed to prevent fuel escape following a loss of integrity of the tank itself, baffles have been placed in tanks to reduce sloshing effects, passive fuel metering systems have been proposed and, finally, sealed fuel tanks have been proposed to prevent overflow and evaporation. None of these piecemeal proposals have involved fuel tank designs which deal with two or more of these considerations in a comprehensive and feasible fashion which is suitable for mass production and which provides economy of fabrication.

The present invention provides a comprehensive treatment of various fuel tank assembly considerations including those set forth above and results in a fuel tank assembly which affords the advantage of a variable volume container and a variable anti-slosh baffle and which readily admits of sealed fuel supply operation and nonimmersed fuel metering. In general, this is accomplished in a tank assembly which includes a substantially rigid outer container and an inner member of relatively pliable material having a portion which divides the interior of the container into fuel storage and air storage sections. The inner member is designed such that a portion thereof may be displaced in a predetermined and predirected fashion such as from top to bottom to reciprocally vary the volumes of the two storage sections and to provide, in varying degrees related to the fuel remaining in the tank, an anti-slosh baffle.

The internal member may be disposed in the container in various fashions, two preferred fashions being disclosed herein. The first fashion involves forming the member as a full liner for the container and the second involves forming the member as a diaphragm which extends across the container and is retained therein by, for example, a bead which is sandwiched into a seam between two container portions.

In the preferred form of the invention, which is illustrated herein, the internal member includes a portion having concentric folds which permit a variable telescopic collapse of the internal member relative to the bottom of the container as fuel is exhausted from the container thereby to accomplish the aforementioned volumetric variation and the anti-slosh baffle effect. Moreover, the folds of the internal member are preferably formed in a spaced, corrugated fashion so as to afford a reserve volume within the container for thermal expansion of the fuel thereby to obviate the necessity for overflow conduits and the like. This thermal expansion capability may be complemented with additional pockets of reserve space between the container and the internal member; for example, such pockets may be disposed peripherally around the tank assembly by suitable formation of the container and the internal liner member.

In accordance with the invention fuel metering is readily accomplished by substantially conventional metering apparatus, such as the well known pivotally operated rheostat, but without requiring the immersion of electrical apparatus in a volatile fuel reservoir. In general, this is accomplished by placing the fuel level monitoring apparatus on the container and operatively disposed between the container and the collapsible portion of the internal member such that the degree of displacement between the container and the displaceable portion of the internal member determines the signal quantity which is generated by the gaging or fuel level monitoring apparatus. The gaging apparatus is thus exclusively within the air storage section of the subject fuel tank assembly and is not in contact with fuel at any time.

In accordance with another aspect of the invention, increased safety from fuel tank rupture and resulting fuel spillage is accomplished by means of a damping type suspension device which permits mounting the container on the vehicle such that a controlled deceleration of the tank obtains in the event of a collision. In general, this involves a mounting means including a deformable element secured to the vehicle and a die or die set secured to the tank and engaging the element at or near a predeformed section. Should a collision result in high acceleration forces on the tank, the mounting means permits the tank to be displaced longitudinally, for example, relative to the vehicle to a limited extent and in an energy damping or absorbing fashion. This controlled deceleration of the tank relative to the vehicle tends to substantially decrease the likelihood of fuel tank rupture in the event of a collision.

Various other features and advantages of the subject invention will become more apparent upon reading the following specification which describes several illustrative embodiments of the invention in detail. This specification is to be taken with the accompanying drawings of which:

FIG. 1 is a side view in cross-section of a first embodiment of the invention in a near-empty condition;

FIG. 2 is a side view in cross-section of the embodiment of FIG. 1 in a near-full condition;

FIG. 3 is an enlarged view of a portion of the embodiment of FIGS. 1 and 2 showing circuit details thereof;

FIG. 4 is a plan view of a representative portion of the embodiment of FIG. 1 taken along the section lines 4—4 thereof;

FIG. 5 is a partial side view in cross-section of a second embodiment of the invention;

Figure 6:
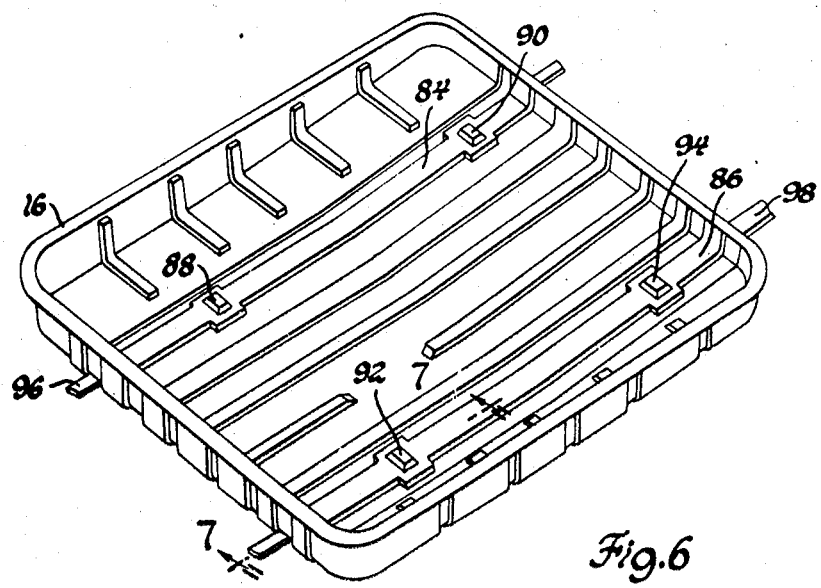
FIG. 6 is a perspective view of a lower tank shell illustrating a preferred mounting arrangement.

Referring now to FIGS. 1 through 4, there is shown an automotive fuel tank assembly 10 including a shallow substantially rectangular container 12 having an upper steel shell 14 and a lower steel shell 16 joined together such as by welding to form a butt seam 17 around the periphery thereof. Container 12 is provided with a fuel filler pipe 18 which extends outwardly and upwardly therefrom. Container 12 is further provided with a fuel outlet 20 through which fuel may be drawn by operation of a conventional fuel pump.

In the embodiment of FIGS. 1 through 4, the tank assembly 10 includes an internal liner 22 of noncorrosive and relatively pliable material, a suitable material being selected from the groups of materials generally known as plastic and elastomers. Nylon is the preferred material. Internal liner 22 is formed with an upper wall 24 and a lower wall 26 which normally are disposed in spaced relation with one another and which over at least portions thereof generally conform to the interior configuration of the container 12. Liner 22 may be bonded to container 12 along the bottom and, possibly, at the corners to prevent movement relative to the container.

The upper wall 24 of the liner 22 has formed therein a plurality of concentric circular folds 28 which permit a generally planar central portion 74 of the liner 22 to be displaced vertically in a telescopic fashion relative to the fixed portions of the assembly 10. As indicated from a comparison of FIGS. 1 and 2, this vertical telescopic displacement takes place in response to varying quantities of unused fuel within the container 12 and operates to vary the volumetric ratio between a fuel storage section 30 and an air storage section 32, both sections being within the confines of the container 12 and the boundary therebetween being defined by the displaceable portion of the liner 22.

Liner 22 is formed with an outwardly and upwardly extending spout portion 34 which, on assembly, is drawn through the filler pipe 18 of the container 12 as shown in FIGS. 1 and 2. The spout portion 34 is preferably of greater length than the filler pipe 18 such that the outermost portion of the spout 34 may be turned back over the annular lip and fixed in place by means of a clamp member 36 having a cylindrical portion 38 which extends partially into the filler pipe 18 as shown. The location of the liner member 22 within the filler pipe 18 of the container 12 is preferably accomplished prior to joining the upper shell 14 to the lower shell 16 and welding the seam 17. Liner 22 is preferably made in two or more pieces which are joined together prior to insertion in the container 12.

At the opposite end of the assembly 10 the fuel outlet 20 receives a small diameter fuel line 40 which extends into the fuel storage section 30 of the container 12 and terminates in a small mesh filter 42 which lies generally along the bottom of the tank assembly 10. A recessed area 44 is formed in the upper shell 14 of the container 12 to grasp the fuel line 40 and the liner member 22 is preferably drawn through the clamping aperture and extended along the fuel line 40 as shown to effect an adequate seal. Various other assemblies in the area of the fuel line 40 and outlet 20 can obviously be used in place of that shown.

When the tank assembly 10 is empty or near empty the planar portion 74 of the liner members 22 is permitted by the concentric circular folds 28 to drop vertically and telescopically toward the bottom wall 26 of the liner 22 which bottom wall rests on and conforms to the bottom shell 16 of the container 12. Under these conditions the fuel storage section 30 is of minimum volume and the air storage section 32 is at maximum volume. As fuel is admitted to the fuel storage section 30 through the filler pipe 18 the increasing volume of fuel causes the plane portion 74 of the liner member 22 to be displaced vertically upwardly telescoping the various corrugated convolutions defined by the folds 28 into one another until the liner member 22 assumes the configuration shown in FIG. 2. In this configuration the tank assembly 10 is substantially full of fuel and the volume of the fuel storage section 30 is at a near maximum while the volume of the air storage section 32 is at a near minimum. Also in this configuration the plane section 74 is at the vertically highest elevation relative to the bottom wall 26 of the liner member 22 which, as previously mentioned, rests on and conforms to the bottom shell 16 of the container 12.

It will be observed that because of the rounded or corrugated configuration of the folds 28 a considerable reserve volume of air space is provided by the annular spaces between the folds 28 and the upper shell 14 of the container 12. This reserve volume, along with additional reserve volume to be described, provides a reserve for thermal expansion of the fuel in the fuel storage section 30 such that overflow pipes and fuel collectors are unnecessary. Moreover, as the fuel is withdrawn from the container 12 through the fuel line 40, the vertical displacement of the plane portion 72 into the center of the fuel tank assembly 10 provides an increasing baffle to prevent and inhibit lateral travel or sloshing of the remaining fuel in the container 12. In the configuration shown in FIG. 1 a substantial volume of unused fuel may exist in a somewhat torroidal volumetric configuration within the container 12. The sloshing of this unused fuel quantity from front to back or side to side within the container 12 is effectively prohibited by the baffle effect of the telescopically displaced portion of the liner member 22.

The anti-slosh feature of the liner member 22 described above is enhanced by controlling the flow of air from the outside into the air storage space 32 and, conversely, by controlling the flow of air from the air storage portion or section 32 back to the outside. As shown in FIGS. 1 and 2 a small cylindrical recess 46 is provided in the upper shell portion 14 to receive a control valve which performs this air flow control function. The valve is identified by reference character 48 and is shown in detail in FIG. 3.

Referring to FIG. 3 the air control valve 48 comprises an inverted cup portinon 50 having an annular arrangement of holes therein and being fixed to a mounting post 52 which is vertically oriented within the cavity 46. A ring 54 is secured to the bottom of the post 52 and operates as a stop for a second smaller cup member 56 which is disposed concentrically about the post 52 and within the recess 46. The second cup member 52 carries about the periphery thereof an annular sealing ring 57 which is provided with a beveled surface to contact the interior surface of the first cup member 50. A spring 58 operates between the cup members 50 and 56 to urge the second cup member 56 toward the stop disc 54. Thus, to permit the relatively unimpeded flow of air through the apertures in the first cup member 50, between the cup member 50 and the sealing ring 57 and thence through the aperture 60 in the bottom of the cylindrical recess 46. Accordingly, air at moderate flow rates is permitted to flow into and out of the air storage section 32 through the normally open valve 48. However, if the movement of the fuel within the container 12 tends to rapidly decrease the volume of the air storage section 32 and thus attempt to force the high air flow through the valve 48 the increased pressure operates on the cup member 56 to oppose the bias of spring 58 and force the ring 57 into sealing relation with the under surface of the first cup member 50. This effectively closes the annularly arranged apertures in the cup member 50 and prevents the flow of air from the air storage section 32 to the outside. The overall effect of the valve 48 is to impede the flow of air, thus, to effectively stiffen the baffle provided by the telescoping portion of the liner member 22 and operate to prevent sloshing of the unused quantity of fuel within the container 12. Under normal conditions the free telescopic displacement of the liner member 22 relative to the upper shell 14 of the tank is permitted to allow fuel to be readily entered into and exhausted from the container 12. Control valve assemblies having designs other than that shown in FIG. 3 may, of course, be employed.

Referring to FIGS. 1 through 3 the fuel tank assembly 10 is shown to include a fuel gaging apparatus 62 of the rheostat type which is mounted on the upper shell 14 of the container 12 and operatively engaged with the displaceable portion of the liner member 22. The gaging apparatus 62 is disposed exclusively within the air storage section of the interior of the container 12 and operates on the principle of monitoring the degree of vertical displacement of the plane portion 74 of the liner member 22 within the container 12. Accordingly, the gaging apparatus 62 includes a conventional distributed wire resistor portion 64 having a wiper (not shown) which is displaced over the distributed wire resistor by means of a pivotally mounted arm 66. Arm 66 terminates in a roller 68 which is disposed against the upper surface of the plane portion 74 of the liner member 22 such that the angular orientation of the arm 66 relative to the resistor portion 64 of the gaging apparatus 62 is determined by the vertical orientation or position of the plane portion 74 relative to the bottom of the tank assembly 10. A rigid plate of metal or plastic may be placed between roller 68 and liner 22 to prevent excessive wear on the liner. FIG. 1 shows the arm 62 in a maximum angular orientation which would produce a near-empty signal from the gaging apparatus 62. FIG. 2 shows the arm 66 in the minimum angle position which, of course, would produce a full indication from the gaging apparatus 62. As shown in FIG. 3 the generally plane portion 74 of the liner 22 may be preformed with a recessed track 72 which is engaged by the roller 68 on the end of the rheostat arm 66. A suitable received or indicator apparatus and a suitable voltage source is, of course, to be connected to the rheostat apparatus 62. This may be accomplished by means of suitable electrical connectors including the connector 70 which is shown in some detail in view of FIG. 3.

In summary the gaging apparatus 2 may be employed to monitor the quantity of unused fuel in the tank assembly 10 by monitoring the degree of vertical displacement of the plane portion of the liner 22 relative to the bottom wall 26 which rests on and conforms to the bottom wall of the container 12. In this manner the gaging apparatus 62 may be like the conventional float controlled type but need not come into contact with the fuel in the tank assembly 10 at any time. Referring to FIG. 4 the container 12 is shown to be preformed in such a fashion as to provide a plurality of peripherally distributed pockets 76 about the tank assembly 10. Moreover, the liner 22 is similarly preformed to have a plurality of peripherally arranged pockets 78 which register with the pocket 76 in the container 12 but, as shown in FIG. 4, are more shallow so as to result in a space between the pocket 78 of the liner 22 and the pocket 76 of the container 12. These peripherally disposed pockets provide further thermal expansion volume to operate in conjunction with the thermal expansion volume provided by the grounded or corrugated folds 28 of the liner 22 when disposed in the position of FIG. 2. In addition, the space between the pockets 76 and 78 also operates to provide a degree of resilience in the liner 22, this resilience being effective to provide a degree of lateral energy absorption due to lateral travel of the fuel within the container 12 during motion of the vehicle upon which the assembly 10 is mounted.

Referring to FIG. 5, a second embodiment of the invention is shown. In the assembly of FIG. 5 the use of primed reference numerals indicates the similarity between the assembly of FIG. 5 and the assembly of FIGS. 1 through 4.

In FIG. 5 the fuel tank assembly 10' is shown to include a steel outer container 12' made up of an upper shell 14' and a lower shell 16'. The lower shell 16' has mounted thereon a filler pipe assembly 18' through which fuel may be placed in the tank assembly 10'. The assembly 10' further includes a diaphragm member 22' of relatively pliable material such as plastic disposed in a generally horizontal configuration within the container 12' and secured in place by means of a peripheral bead 82 which is sandwiched between the peripheral portions of the upper shell 14' and the lower shell 16' which forms a butt seam 17'. Liner 22' is formed with a plurality of concentric circular folds 28' which permit a lower plane portion 74' of the diaphragm member 22' to be vertically and telescopically displaced relative to the lower shell portion 16' of the container 12'. This displacement, of course, operates to vary the volumetric ratio between the fuel storage section 30' and an air storage section 32' within the container 12', these two sections being separated by the diaphragm member 22'. The assembly 10' of FIG. 5 is further understood to include the air flow control valve 48 of FIG. 3 and a suitable fuel outlet means preferably of the type shown in FIGS. 1 and 2.

The assembly 10' of FIG. 5 operates substantially like that of assembly 10' shown in FIGS. 1 through 4. Accordingly, as fuel is introduced into the fuel storage section 30' by means of the filler pipe 18' the plane portion 74' of the diaphragm member 22' is caused to be displaced upwardly thereby to telescope the concentric circular folds 28' in the diaphragm member 22'. This vertical displacement operates to increase the volume of the fuel storage section 32 and to correspondingly decrease the volume in the air storage section 32'. The degree of extension of the vertically displaceable portion of the diaphragm member 22 operates to cause a variable baffling effect as well as to regulate the volumetric ratio as previously described. A degree of expansion in the volume of the fuel due to thermal variations is again permitted by the rounded annular sleeve spaces which are defined between the folds 28 and the inner surface of the upper shell portion 14' as was the case in the assembly 10 of FIG. 2.

It is to be understood that a suitable gaging apparatus, such as 62 shown in FIGS. 1 through 3, may also be used in conjunction with the assembly of FIG. 5. The assembly of FIG. 5 does not, of course, provide all of the advantages of a full tank assembly liner but does operate to provide the compartmentizing of the container 12', the baffling effect and further admits the nonimmersion fuel metering and thermal expansion of the contained fuel.

Figure 7:
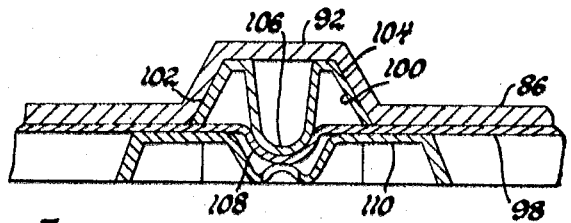
FIG. 7 is a side view of a detail of the arrangement of FIG. 6 taken along a section line 7—7 thereof.
Figure 8:
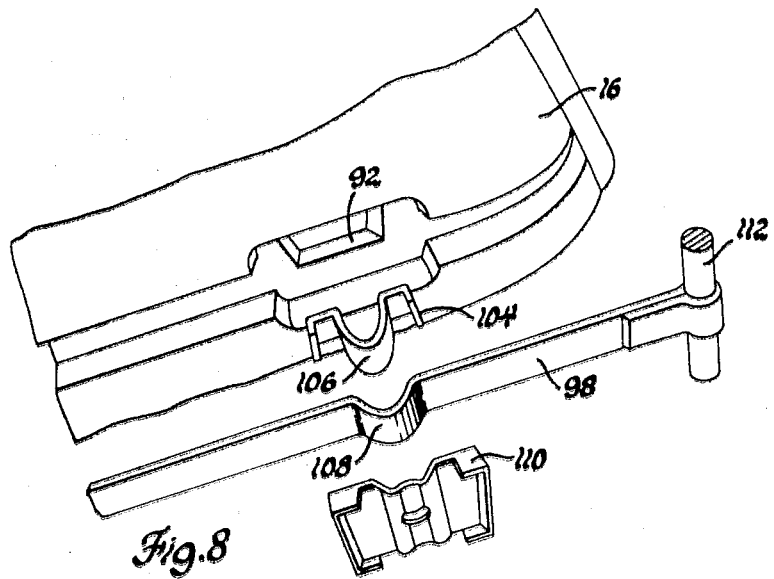
FIG. 8 is an exploded perspective view of a detail in a mounting arrangement of FIGS. 6 and 7.

Mounting of the assembly 10 on the vehicle is accomplished by means of mounting apparatus shown in FIGS. 6, 7 and 8. Referring to those FIGURES, FIG. 6 shows the bottom shell 16 of the assembly 10 to have formed therein a pair of parallel longitudinal channels 84 and 86, said channels appearing as recesses in the exterior surface of the shell 16. In addition, channel 84 has formed therein at longitudinally spaced positions the further recessed pockets 88 and 90. In a similar fashion further recessed pockets 92 and 94 are formed at longitudinally spaced positions in the channel 86. The channels 84 and 86 and the further recessed pockets 88, 90, 92 and 94 operate in conjunction with elongated members 96 and 98 of deformable material, such as steel, to suspend the tank assembly 10 relative to a vehicle such that the imposition of extremely high acceleration loads on the tank assembly 10 due to a collision of the vehicle carrying the tank assembly 10 with another vehicle or with a stationary object will permit the tank assembly 10 to be displaced longitudinally relative to the vehicle over a short displacement length during which an energy absorption process is accomplished.

Referring to FIG. 7, the details of the mounting structure in the vicinity of the recess 92 in channel 86 are shown in greater detail. The apparatus in the vicinity of recess 92 is representative of the apparatus to be found in the vicinity of each of the other recesses 88, 90 and 94 and, thus, the explanation of one such apparatus will suffice for all. Disposed within the recess 92 of channel 86 is a first die member 100 having fingers 102 and 104 which seat the die member firmly within the recess 92 and prevent longitudinal or lateral displacement thereof. Die member 102 is further provided with a rounded tongue portion 106 which extends vertically downwardly relative to the recess 82 and into the area of the channel 86. Tongue portion 106 extends into direct and mating engagement With a deformed section 108 of the elongated strap member 98. A second die member 110 is disposed beneath the deformed section 106 of the elongated strap member 98 so as to sandwich the strap member 98 between the second die member 110 and the first die member 104. Second die member 110 is suitably secured to the first die member in this complementary relationship by means of bolts or other fasteners, not shown. Finally, the elongated strap member 98 is secured at both ends to the frame of an automobile as represented by the rod 112 in FIG. 8. The elongated strap member 98, along with the parallel strap meMber 96, is preferably oriented in the longitudinal direction relative to the vehicle to which it is attached.

In operation, the mounting apparatus of FIG. 8 simply secures the tank assembly 10 to the vehicle for transportation therewith under normal conditions. Since the strap members 96 and 98 are rigidly secured to the vehicle and have more than adequate structural strength to hold up the tank assembly 10, the tank assembly 10 may be simply thought of as being securely and immovably cradled within the strap members 96 and 98. However, should a moving vehicle collide with another vehicle or anothe heavy object, the rapid deceleration of the vehicle imposes a high accelerative force on the tank assembly 10 causing it to continue to be translated in the direction of original displacement. This accelerative force, operating in the longitudinal direction relative to the vehicle causes the tank assembly 10, along with the die members 100 and 110 which are secured thereto, to be displaced forwardly thereby deforming the steel strap members 96 and 98 between the die members in the vicinity of each of the recesses 88, 90, 92 and 94. This continuous deformation of the steel strap members 96 and 98 causes a working of the metal which results in the absorption of the kinetic energy of the tank assembly over a short but adequate displacement such that the abnormally high accelerative loads which would otherwise be imparted to the fuel tank assembly are greatly reduced. This substantial reduction in accelerative loads tends to decrease the tendency to rupture the fuel tank assembly and, thus, greatly decreases the risk of fuel spillage following collision.

To summarize the invention as illustrated herein, a fuel tank assembly comprises a relative rigid external steel container 12 (12') and a relatively pliable internal member 22 (22') which divides the interior of the container 12 (12') into a fuel storage section 30 (30') and an air storage section 32 (32'). The internal member 22 (22') is provided with a plurality of concentric circular folds 28 (28') which permit a central portion of the internal member to be displaced telescopically in the vertical direction thereby to vary the volumetric ratio between the fuel and air storage sections and variably baffle the interior of the fuel storage section and prevent the inordinate sloshing of unused fuel therein. Moreover, the flow of air into and out of the air storage section 32 (32') is regulated by means of a valve 48 which permits only relatively low flow rates and which responds to excessive flow rates to effectively close against the operation of a bias spring 58.

The tank assembly 10 (10') of the subject invention permits thermal expansion under varying temperature conditions without the need for overflow and fuel absorption facilities and further permits the use of nonimmersed fuel monitoring apparatus 62 which may be disposed on the containder 12 (12') so as to monitor fuel as a function of the vertical displacement of the central and vertically displaceable portion of the internal member 22 (22').

Finally, the tank assembly 10 is preferably mounted on a vehicle by means of an energy absorbing mounting apparatus which includes a deformable securement member 96, 98 and one or more die members 106, 110 which cooperate with the deformable securement member to permit limited energy absorbing displacement of the tank assembly 10 relative to the vehicle under high and abnormal accelerative loads thereby to decrease the accelerative loads imposed on the tank and minimize the risk of fuel tank rupture.

It is to be understood that the invention has been described with reference to preferred embodiments thereof in accordance with the patent laws and that such modifications are to be regarded only as illustrations and not as limiting the invention.

The embodiments of the invention in which an exclusive property or privilege is claimed are defined as follows:

1. A fuel tank assembly comprising a fixed outer container, an internal member having a displaceable portion dividing the container into fuel and air storage sections of reciprocally variable volumes, said internal member comprising a diaphragm portion extending substantially horizontally across the interior of the container and having a plurality of circular folds to permit the center thereof to be displaced vertically within the container in accordance with the fuel quantity in said fuel storage section, said circular folds defining at the center of said internal member a substantially flat unfolded area having an elongated and recessed track formed therein, and gaging means on the container for monitoring the position of the displaceable portion, said gaging means comprising a fixed portion mounted on said container within said air storage section and a pivotal lever arm extending from said fixed portion toward said elongated track, bearing means on the end of said lever and in engagement with said track, said lever being pivotally connected to said fixed portion and oriented so that the bearing means rides along said track as said internal member moves vertically within said container, said lever and said fixed portion being mechanically and electrically interrelated so as to produce an electrical output signal of a variable character representing the vertical position of said center of said internal member within said container.

* * * * *